(12) United States Patent
Chromcak

(10) Patent No.: US 11,196,348 B2
(45) Date of Patent: Dec. 7, 2021

(54) METHODS AND SYSTEMS OF CONTROLLING SWITCHING FREQUENCY OF A SWITCHING POWER CONVERTER

(71) Applicant: SEMICONDUCTOR COMPONENTS INDUSTRIES, LLC, Phoenix, AZ (US)

(72) Inventor: Jan Chromcak, Roznov pod Radhostem (CZ)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 81 days.

(21) Appl. No.: 16/799,012

(22) Filed: Feb. 24, 2020

(65) Prior Publication Data

US 2020/0373846 A1    Nov. 26, 2020

Related U.S. Application Data

(60) Provisional application No. 62/851,323, filed on May 22, 2019.

(51) Int. Cl.
| | |
|---|---|
| *H02M 3/335* | (2006.01) |
| *H02M 1/08* | (2006.01) |
| *H02M 1/00* | (2006.01) |

(52) U.S. Cl.
CPC ......... *H02M 3/33569* (2013.01); *H02M 1/08* (2013.01); *H02M 1/0012* (2021.05)

(58) Field of Classification Search
CPC .. H02M 3/33569; H02M 1/08; H02M 1/0012; H02M 3/33553; H02M 3/3353
See application file for complete search history.

(56) References Cited

U.S. PATENT DOCUMENTS

| | | | |
|---|---|---|---|
| 4,465,983 A | 8/1984 | Hogeboom | |
| 5,929,618 A * | 7/1999 | Boylan | H02J 1/102 323/282 |
| 2004/0178746 A1 * | 9/2004 | Nemirow | H05B 41/2856 315/291 |
| 2014/0210350 A1 * | 7/2014 | Yang | H05B 45/46 315/122 |
| 2016/0336848 A1 | 11/2016 | Meola et al. | |

* cited by examiner

*Primary Examiner* — Kyle J Moody
(74) *Attorney, Agent, or Firm* — Dickinson Wright PLLC; Mark E. Scott

(57) ABSTRACT

Controlling switching frequency of a switching power converter. At least some example embodiments are methods of operating a switching power converters, comprising: operating, by a primary-side controller, a switching power converter at a first frequency set by a resistor coupled to a first pin of the primary-side controller; and sensing a synchronization signal applied to the first terminal of the primary-side controller, the synchronization signal has a second frequency that is variable; and operating, by the primary-side controller, the switching power converter at the second frequency.

19 Claims, 5 Drawing Sheets

METHODS AND SYSTEMS OF CONTROLLING SWITCHING FREQUENCY OF A SWITCHING POWER CONVERTER

CROSS-REFERENCE TO RELATED APPLICATIONS

This application claims the benefit of U.S. Provisional Application No. 62/851,323 filed May 22, 2019 titled "Adaptive Duty Cycle Limit." The provisional application is incorporated by reference herein as if reproduced in full below.

BACKGROUND

Packaging for integrated circuits encapsulates the integrated circuits, and provides for electrical connection to the encapsulated integrated circuit by way of pins or terminals electrically exposed on the outside of the packaging. For a particular package size (e.g., a small outline integrated circuit (SOIC) with 16 terminals (i.e., SOIC-16)), the number of terminals is limited. In some cases terminals are either omitted or not used for various reasons (e.g., physical separation between signals driven to or from the terminals to reduce cross-talk).

In the realm of switching power converters, the controllers (e.g., primary-side controllers, secondary-rectifier controllers) for the switching power converters are, in many cases, packaged integrated circuits. However, for set up and operation of the controllers, many connections are made to controller by way of the terminals. For example, the operating frequency of the switching power converter may be set by a resistor coupled to a terminal of the primary-side controller. However, problems arise when additional information and/or signals need to be provided the controller, but no additional terminals are available.

BRIEF DESCRIPTION OF THE DRAWINGS

For a detailed description of example embodiments, reference will now be made to the accompanying drawings in which.

DEFINITIONS

Figure 1:
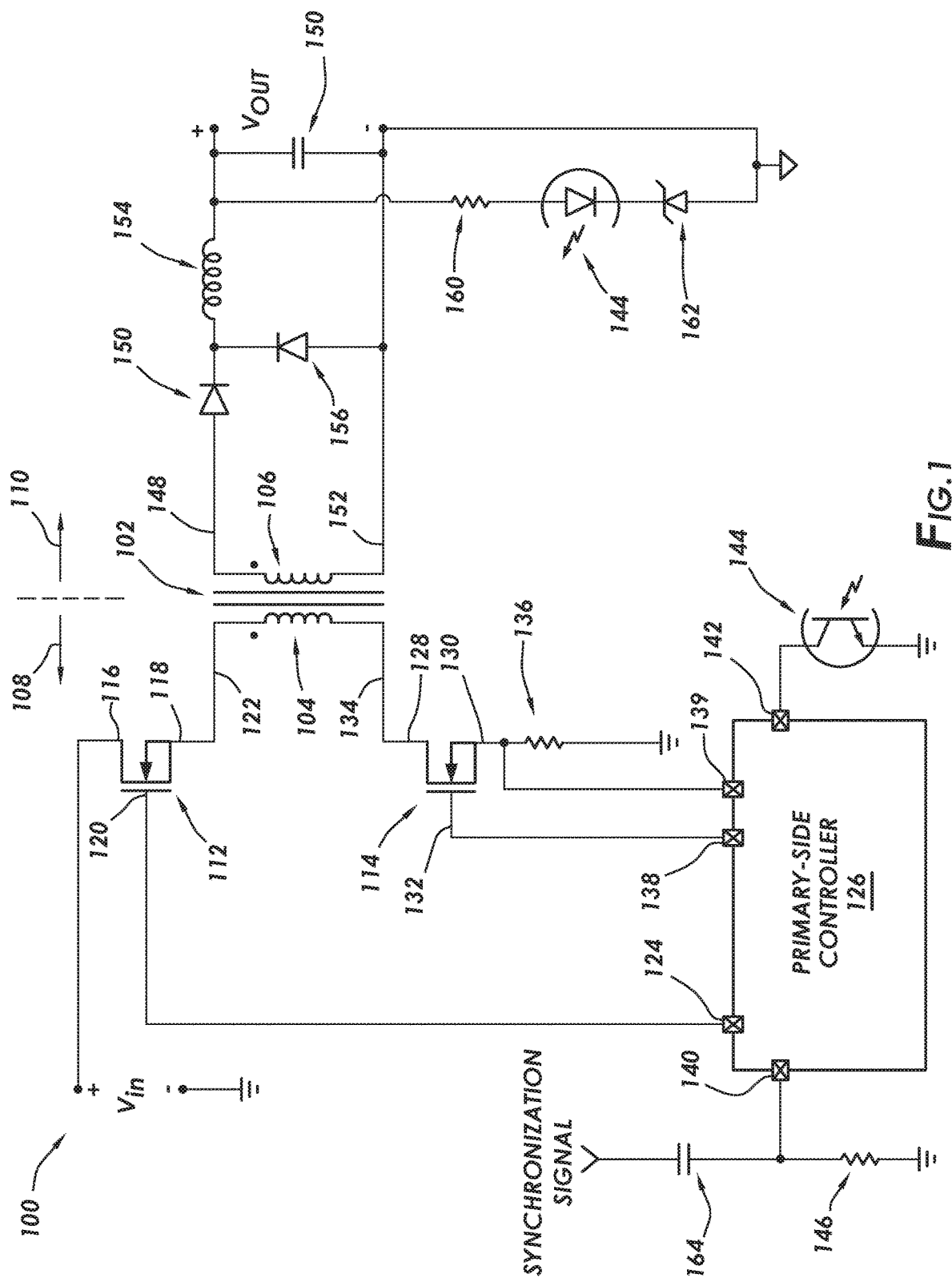
FIG. 1 shows circuit diagram of a switching power converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Period," in reference to a time associated with a periodic signal, shall mean the time duration between any two consistent features of the periodic signal. For example, for a pulse signal comprises a series of pulses, the period may be the time duration between two consecutive rising edges, or two consecutive falling edges.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Example embodiments are directed to methods and systems of controlling switching frequency of a switching power converter. More particularly, example embodiments are directed to a primary-side controller for switching power converters, where the primary-side controller senses voltages and signals applied to a terminal of the primary-side controller, and control switching frequency of a main electrically-controlled switched based on the voltages and signals sensed. More particularly still, the example primary-side controller may operate at a fixed frequency selected by a resistance coupled to the terminal of the primary-side controller (e.g., by sensing a direct current (DC) voltage associated with the resistor), and may also operate at a synchronization frequency when a synchronization signal (e.g., an alternating current (AC) signal) is applied to the terminal. In yet still further embodiments, when operating at the synchronization frequency set by the synchronization signal, the primary-side controller may limit duty cycle in each period of the synchronization signal. The specification now turns to an example switching power converter.

FIG. 1 shows circuit diagram of a switching power converter in accordance with at least some embodiments. In particular, the switching power converter 100 comprises a transformer 102 that defines a primary winding 104 and a secondary winding 106. The transformer 102 conceptually creates a primary side 108 of the switching power converter 100, and a secondary side 110 of the switching power converter 100. The conceptual division between the primary side 108 and the secondary side 110 is an electrical concept, and not necessarily a physical concept. In the example switching power converter 100, the primary side 108 is electrically isolated from the secondary side 110 by way of the transformer 102, but electrical isolation is not required in all cases.

Turing to the primary side 108, the example switching power converter 100 is arranged for forward operation, and thus comprises a high-side electrically-controlled switch 112 and a low-side electrically-controlled switch 114. In the example system of FIG. 1, the electrically-controlled switches are illustrated as field effect transistors (FETs), but any suitable electrically-controlled switch (e.g., junction transistors, silicon controlled rectifiers) may be used. The electrically-controlled switches are hereafter referred to as high-side FET 112 and low-side FET 114.

The high-side FET 112 defines a drain 116, a source 118, and a gate 120. The drain 116 is coupled to the positive lead of the input voltage VIN. The source 118 is coupled to a first lead 122 of the primary winding 104. The gate 120 is coupled to a high-side drive terminal 124 of a primary-side controller 126. The low-side FET 114 likewise defines a drain 128, a source 130, and a gate 132. The drain 128 is coupled to a second lead 134 of the primary winding 104. The source 130 is coupled to ground on the primary side by way of a sense resistor 136. The gate 132 is coupled to a low-side drive terminal 138. The sense resistor 136 has a first lead coupled to the source 130 of the low-side FET 114, and the first lead and source 130 are coupled to a sense terminal 139 of the primary-side controller 126. As the name implies, the sense resistor is used to sense current flow through the primary winding 104 when the low-side FET 114 is conductive.

The example primary-side controller 126 further defines a synchronization terminal 140 and a feedback terminal 142. The example feedback terminal 142 is coupled to the transistor side of an optocoupler 144, and the light emitting diode side of the optocoupler 144 is coupled to the output voltage $V_{OUT}$. The LED side of the optocoupler 144 produces photons at a rate proportional to the output voltage $V_{OUT}$, and the photons excite the base of the transistor side of the optocoupler 144. The conductivity of the transistor side of the optocoupler is proportional to output voltage $V_{OUT}$. Thus, the primary-side controller 126 receives a signal indicative of output voltage $V_{OUT}$ by way of the feedback terminal 142.

In the example system, an external resistor 146 is coupled between the synchronization terminal 140 and ground on the primary side 108, and the value of the resistance sets the default operating frequency used by the primary-side controller 126 to control switching of the high-side FET 112 and low-side FET 114. To read the resistance of the external resistor 146, the primary-side controller 126 may apply a current to the synchronization terminal 140, and read a DC voltage on the synchronization terminal 140 as caused by the external resistor 146. The primary-side controller 126 may thus set the operating frequency of the switching power converter 100 based on the voltage sensed. Additional terminals and connections to the primary-side controller 126 (e.g., power, ground on the primary side) would be present, but such additional terminals and connections are not shown so as not to unduly complicate the figure.

Turning now to the secondary side 110, in the example system a first lead 148 of the secondary winding 106 is coupled to the anode of diode 150, and the second lead 152 of the secondary winding 106 is coupled to and defines the return or common on the secondary side 110. The cathode of the diode 150 is coupled to the first lead of an inductor 154, and the second lead of the inductor 154 defines the positive connection of the output voltage $V_{OUT}$. Another diode 156 has an anode that is coupled to the second lead 152 of the secondary winding 106, and an anode that is coupled to the cathode of the diode 150. A capacitor 158 is coupled to between the second lead of the inductor 154 and the second lead of the inductor 154. The capacitor 158 stores charge, smooths the voltage and current provided by the secondary winding 106, and may also act to provide energy during periods of time when no current is being provided from either the secondary winding 106 or collapsing field of the inductor 154.

Still referring to FIG. 1, the secondary side 110 further comprises the LED side of the optocoupler 144. In particular, the anode of the LED side of the optocoupler 144 is coupled to the positive lead of the output voltage $V_{OUT}$ by way of a resistor 160. The cathode of the LED side of the optocoupler 144 is coupled to common on the secondary side by way of the a Zener diode 162. Thus, when the output voltage $V_{OUT}$ exceeds a predetermined threshold set by the Zener diode 162, current flows through the optocoupler 144 and thus a voltage feedback is provided to the primary-side controller 126.

In operation, the primary-side controller 126 operates the switching power converter 100 at an initial frequency set by the external resistor 146. In particular, the primary-side controller 126 drives the high-side drive terminal 124 to make the high-side FET 112 conductive, and likewise drives the low-side drive terminal 138 to make the low-side FET 114 conductive. Current thus flows from the input voltage VIN, through the high-side FET 112, through the primary winding 104, through the low-side FET 114, through the sense resistor 136, and then to ground on the primary side 108. Either based on a current sensed through the sense terminal 139, or based on reaching a duty cycle limit, the primary-side controller 126 turns off the high-side FET 112 and the low-side FET 114. Additional circuits (e.g., diodes, additional FETS), not specifically shown, may be used to address the inductive effects of the primary winding 104. At some later time, based on the initial frequency, the cycle repeats. Thus, the FETs and primary-side controller 126 apply time-varying voltage and time-varying current to the primary winding 104, which creates voltage and current on the secondary winding 106. The primary side 108 of FIG. 1 shows a two-switch arrangement; however, the various example methods and systems are not limited to two-switch forward converters. The methods and systems may be applicable to any set-up on the primary side for forward converters, such as half-bridge, full-bridge, or inductor-inductor-capacitor (LLC) primary side setup. Moreover, the example methods and systems are not limited to forward converters, and may find application in any type of switching power converter, such as non-isolated converters, and flyback power converters.

On the secondary side 110, voltage produced by the secondary winding 106 (with a polarity shown by the dot convention in FIG. 1) creates a current that flows through the diode 150, charges the field associated with the inductor 154, and eventually flows to the capacitor 158 and output voltage $V_{OUT}$. When the secondary winding 106 forward biases the diode 150, the diode 156 is reversed biased. When the voltage and current provided by the secondary winding 106 cease in each switching period, the inductor 154 continues to supply current as the field around the inductor 154 collapses. Diode 156 (sometimes referred to as a freewheeling diode) provides the current path for the inductor current during field collapse of the inductor 154. The secondary side 110 of FIG. 1 shows a passive rectification and a buck arrangement using inductor 154; however, the various example methods and systems are not limited to the precise secondary side 110 shown in FIG. 1. The methods and systems may be applicable to any secondary side arrangement, including secondary sides using active rectification (e.g., FETs) and, depending on the set-up and operation of the primary side 108, half-wave and full-wave rectification arrangements.

Still referring to FIG. 1, while in some cases the switching power converter 100 may be operated as a stand-alone converter, in other cases a plurality of switching power converters may be operated in parallel to meet amperage requirements of a load. In such cases, it may be beneficial to synchronize the operating frequencies of the various switching power converters. To achieve synchronization, the primary-side controller 126 may receive a synchronization signal. If the packaging of a primary-side controller has a sufficient number of terminals available, the synchronization signal may be received on a dedicated terminal. However, if no additional terminals are available to dedicate to receiving the synchronization signal, difficulties arise. In accordance with example embodiments, the primary-side controller 126 is designed and constructed to make dual use of a terminal, and in particular to make dual use of the synchronization terminal 140. That is, the example primary-side controller 126 operates the switching power converter 100 at the initial frequency set by the external resistor 146 coupled to the synchronization terminal 140. However, the primary-side controller 126 also monitors for the presence of a synchronization signal (e.g., an AC signal) applied to the synchronization terminal 140. When the synchronization signal is sensed or detected by the primary-side controller 126, the primary-side controller 126 operates the switching power converter 100 at the frequency and phase of the synchronization signal. In some cases, the synchronization signal has frequency that is variable, and when synchronized to the synchronization signal the primary-side controller 126 tracks the frequency and phase of the synchronization signal. In the example switching power converter 100, a synchronization signal is applied to the synchronization terminal 140 through a capacitor 164. The capacitor 164 blocks the DC signal associated with the resistor 146 setting the initial frequency.

Figure 2:
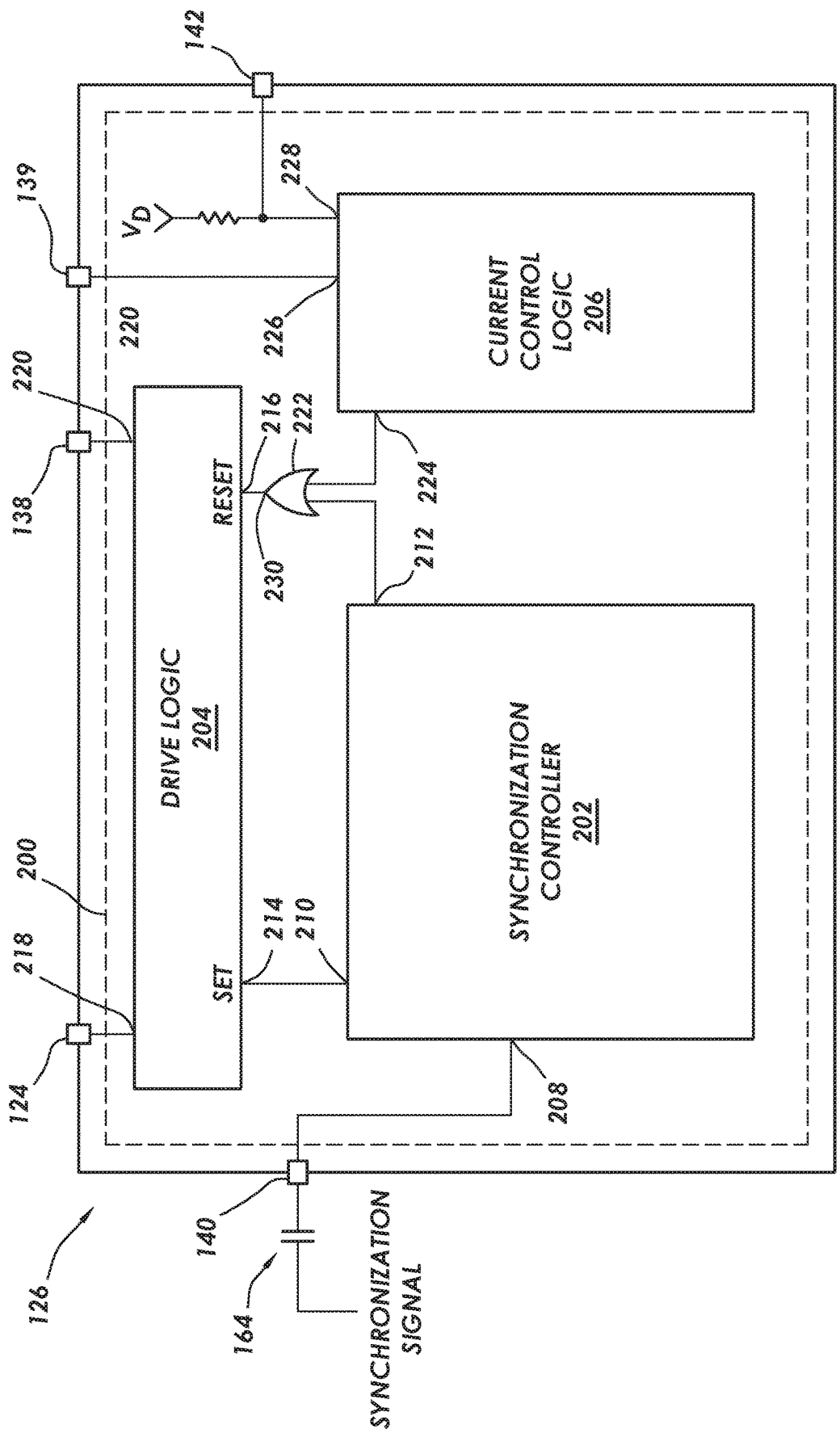
FIG. 2 show a block diagram of a primary-side controller 126 in accordance with at least some embodiments.

FIG. 2 show a block diagram of a primary-side controller 126 in accordance with at least some embodiments. In particular, FIG. 2 shows the primary-side controller 126 as a packaged semiconductor device or packaged integrated circuit device having a plurality of externally accessible pins or terminals. Visible in FIG. 2 are the high-side drive terminal 124, the low-side drive terminal 138, the sense terminal 139, the synchronization terminal 140, and the feedback terminal 142. Within the packaged device resides a semiconductor die 200 upon which the various electrical circuits are monolithically constructed. While FIG. 2 shows only a single semiconductor die 200, two or more semiconductor dies may be packaged together (i.e., a multi-chip module) to create the primary-side controller 126.

The example primary-side controller 126 defines a synchronization controller 202, a drive logic 204, and a current control logic 206. The synchronization controller 202 defines a synchronization input 208, a set output 210, and a reset output 212. The synchronization input 208 is coupled to the synchronization terminal 140. The drive logic 204 defines a set input 214, a reset input 216, a high-drive output 218, and a low-drive output 220. The set input 214 is coupled to the set output 210 of the synchronization controller 202. The reset input 216 is coupled to the reset output 212 the synchronization controller 202 by way of a logic OR gate 222. The high-drive output 218 is coupled to the high-side drive terminal 124, and the low-drive output 220 is coupled to the low-side drive terminal 138. The drive logic 204 is configured to drive control signals to the control inputs of electrically controlled switches, and in particular, the drive logic 204 is configured to drive the gates 120 and 132 of the high-side FET 112 and low-side FET 114, respectively. Further still, the drive logic 204 is configured to assert the high-drive output 218 and assert the low-drive output 220 responsive to assertion of the set input 214. Oppositely, the drive logic 204 is configured to de-assert the high-drive output 218 and de-assert the low-drive output 220 responsive to assertion of the reset input 216.

The current control logic 206 defines a reset output 224, a sense input 226, and a feedback input 228. The sense input 226 is coupled to the sense terminal 139. The feedback input 228 is coupled to the feedback terminal 142. The reset output 224 is coupled to the logic OR gate 222, and the logic output 230 of the logic OR gate 222 is coupled to the reset input 216 of the drive logic 204. In operation, during each cycle of the switching power converter 100 (FIG. 1) (e.g., during periods of time when the high-side FET 112 and low-side FET 114 are conductive), the current control logic 206 monitors a signal indicative of current flow in the primary winding by way of the sense terminal 139. When the signal indicative of current flow meets or exceeds a predetermined threshold, the current control logic 206 asserts the reset output 224, which assertion propagates to the reset input 216 of the drive logic 204. The predetermined threshold may be determined based on a signal indicative of output voltage $V_{OUT}$ sensed by way of the feedback terminal 142. That is, when output voltage $V_{OUT}$ is low, the predetermined threshold is increased. And oppositely, when output voltage $V_{OUT}$ is high, the predetermined threshold is decreased. Thus, in normal operation the duty cycle of the signals applied to the gates of the FETs on the primary side is adjusted based the output voltage $V_{OUT}$.

Figure 3:
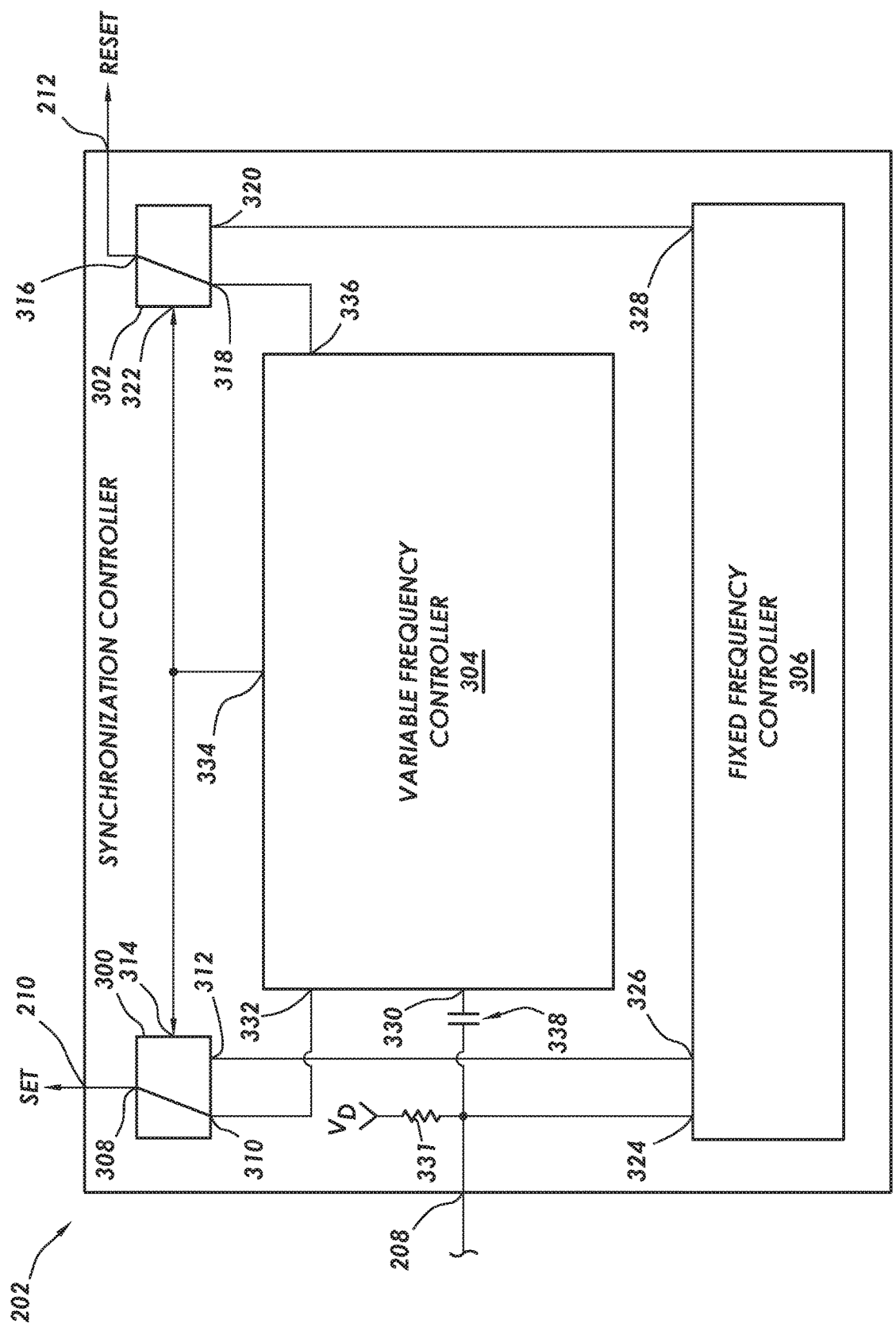
FIG. 3 shows a block diagram of a synchronization controller in accordance with at least some embodiments.

FIG. 3 shows a block diagram of a synchronization controller 202 in accordance with at least some embodiments. In particular, the example synchronization controller 202 comprises a set multiplexer 300, a reset multiplexer 302, a variable frequency controller 304, and a fixed frequency controller 306. The multiplexers are each drawn as a single-pole, double throw switches for purpose of explanation; however, such should not be read to require that physical switches are present. The functionality can be implemented in silicon using two electrically controlled switches, for example two complementary FETs. The example set multiplexer 300 defines a common terminal 308, a first switch terminal 310, a second switch terminal 312, and a control terminal 314. The common terminal 308 is coupled to the set output 210. The example reset multiplexer 302 defines a common terminal 316, a first switch terminal 318, a second switch terminal 320, and a control terminal 322. The common terminal 316 is coupled to the reset output 212.

The fixed frequency controller 306 defines a sense input 324, a set output 326, and a reset output 328. The sense input 324 is coupled to the synchronization input 208. The set output 326 is coupled to the second switch terminal 312 of the set multiplexer 300, and the reset output 328 is coupled to the second switch terminal 320 of the reset multiplexer 302. In operation, the fixed frequency controller 306 senses a signal associated with the external resistor 146 (FIG. 1), and drives a set signal to the drive logic 204 (FIG. 2) at a frequency indicated by the external resistor 146. For example, the sense input 324 may be coupled to a pull-up resistor 331 to an internal supply voltage VD. The pull-up resistor 331 and external resistor 146 thus form a voltage divider, and the fixed frequency controller 306 senses a DC voltage created by the voltage divider. Thus, the synchronization controller 202, and particularly the fixed frequency controller 306, is configured assert the set input to the drive logic 204 at an initial frequency indicated by the DC voltage sensed. In non-fault operation the drive logic 204 is reset by the current control logic 206 (FIG. 2) based on a predetermined threshold current; however, the fixed frequency controller 306 may also provide a reset signal by way of the reset output 328 to ensure duty cycle limitations are met in fault conditions (e.g., shorted output voltage $V_{OUT}$). For example, if the switching power converter is operated as a two switch forward converter, the duty cycle of the drive signals applied to the FETs on the primary side may be limited to 50%.

Still referring to FIG. 3, the example variable frequency controller 304 defines a sense input 330, a set output 332, a control output 334, and a reset output 336. The sense input 330 is coupled to the synchronization input 208 by way of a DC blocking capacitor 338. The set output 332 is coupled to the first switch terminal 310 of the set multiplexer 300. The control output 334 is coupled the control input 314 of the set multiplexer 300, and the control output 334 is also coupled to the control terminal 322 of the reset multiplexer 302. The reset output 336 is coupled to the first switch terminal 318 of the reset multiplexer 302. In operation, initially the fixed frequency controller 306 senses the DC voltage associated with the external resistor 146 (FIG. 1) and asserts the set input to the drive logic 204 (FIG. 2) at an initial frequency set by the DC voltage. Simultaneously the variable frequency controller 304 monitors the synchronization input 208 for an AC signal being a synchronization signal, where the synchronization signal may have a frequency that is variable. When the variable frequency controller senses a synchronization signal applied to the synchronization terminal 140 (FIG. 1), the variable frequency controller 304 takes over from the fixed frequency controller 306. In the example system, when the variable frequency controller 304 senses a synchronization signal, the variable frequency controller 304 asserts the control output 334. Asserting the control output 334 changes the switch positions of the set multiplexer 300 and reset multiplexer 302 such that the set signals and reset signals applied to the set output 210 and reset output 212, respectively, are provided from the variable frequency controller 304 rather than the fixed frequency controller 306. Thus, the variable frequency controller 304 asserts the set input 214 to the drive logic 204 (FIG. 2) at the frequency indicated by the synchronization signal in the presence of the synchronization signal on the synchronization terminal 140.

Again, in non-fault operation the drive logic 204 (FIG. 2) is reset by the current control logic 206 (FIG. 2) based on a predetermined threshold current; however, the variable frequency controller 304 may also provide a reset signal by way of the reset output 336 to ensure duty cycle limitations are met (e.g., to limit the duty cycle of the drive signals applied to the FETs to 50%) during fault operations.

Figure 4:
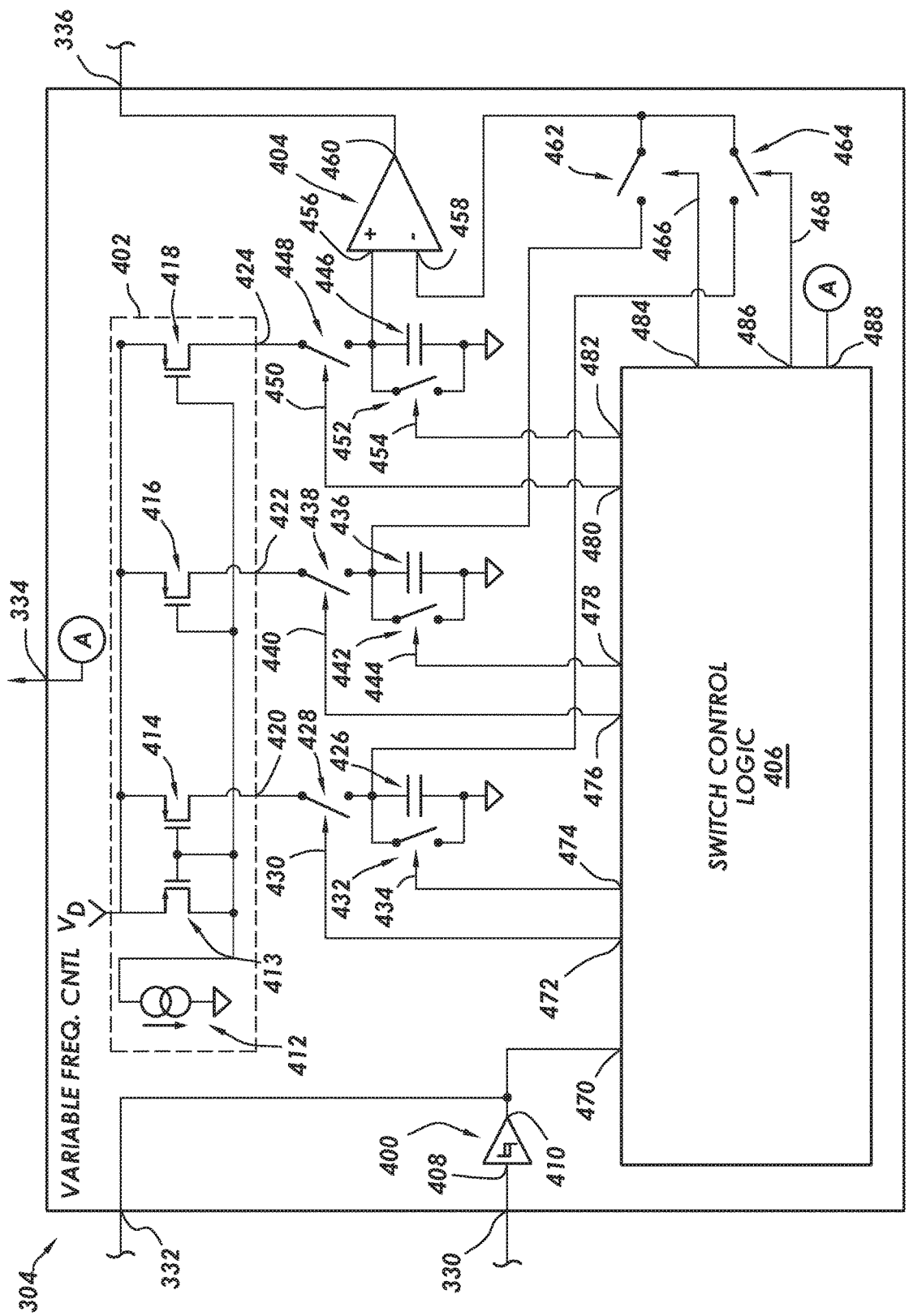
FIG. 4 shows a partial block diagram, partial electrical schematic, of a variable frequency controller in accordance with at least some embodiments.

FIG. 4 shows a partial block diagram, partial electrical schematic, of a variable frequency controller 304 in accordance with at least some embodiments. In particular, the variable frequency controller comprises a Schmitt-trigger buffer 400, a current mirror circuit 402, a comparator 404, a switch control logic 406, and a series of capacitors and switches that will be addressed turn. The example Schmitt-trigger buffer 400 defines a buffer input 408 coupled to the sense input 330, and a buffer output 410. The buffer output 410 is coupled to the set output 332 and is coupled to the switch control logic 406. The Schmitt-trigger buffer 400 provides snap-action changes of state to reduce noise that may be associated with the synchronization signal; however, a Schmitt-trigger buffer is not strictly required, and other, non-Schmitt-trigger buffers may also be used.

The example current mirror circuit 402 comprises a current source 412 coupled to a series of transistors, and in the example system a series of FETs. A primary FET 413 is coupled to the current source 412, and a series of secondary FETs 414, 416, and 418 define a first mirror output 420, a second mirror output 422, and a third mirror output 424, respectively. The first mirror output 420 thus produces a mirror current proportional to the current of the current source 412. The second mirror output 422 produces a mirror current proportional to the current of the current source 412. The third mirror output 424 produces a mirror current proportional to the current of the current source 412. In some cases, each mirror current is a 1:1 proportional to the current through the current source 412; however, in other cases the mirror currents may be more or less than the current through the current source 412, at the discretion of the circuit designer. When greater mirror current is desired, the size (e.g., width and length) of the secondary FETS 414-418 is selected to be larger than the size (e.g., width and length) of the primary FET 413. Oppositely, when lesser mirror current is desired, the size of the secondary FETS 414-418 is selected to be smaller than the size of the primary FET 413.

The first mirror output 420 couples a sense capacitor 426 by way of an electrically-controlled switch 428 illustratively drawn as a single-pole single-throw switch. Switches shown as single-pole single-throw switches may take any suitable form (e.g., FETs, junction transistors, silicon-controlled rectifiers). Thus, the electrically-controlled switch 428 is hereafter referred to as "switch 428". The switch 428 may take any suitable form, such as a transistor (e.g., a FET). The switch 428 defines a control input 430. The first mirror output 420 is coupled to a first terminal of the switch 428, and the second terminal of the switch 428 is coupled to a first lead of the sense capacitor 426. The second lead of the sense capacitor 426 is couple to ground or common of the primary-side controller. A shorting electrically-controlled switch 432 (hereafter "shorting switch 432") is coupled in parallel with the sense capacitor 426. The shorting switch 432 defines a control input 434. As will be discussed in greater detail below, the switch 428 periodically closes to charge the sense capacitor 426, and the shorting switch 432 periodically closes to discharge the sense capacitor 426.

Still referring to FIG. 4, the second mirror output 422 is coupled to a sense capacitor 436 by way of an electrically-controlled switch 438 (hereafter "switch 438"). The switch 438 defines a control input 440. The second mirror output 422 is coupled to a first terminal of the switch 438, and the second terminal of the switch 438 is coupled to a first lead of the sense capacitor 436. The second lead of the sense capacitor 436 is coupled to ground or common of the primary-side controller. A shorting electrically-controlled switch 442 (hereafter "shorting switch 442") is coupled in parallel with the sense capacitor 436. The shorting switch 442 defines a control input 444. As will be discussed in greater detail below, the switch 438 periodically closes to charge the sense capacitor 436, and the shorting switch 442 periodically closes to discharge the sense capacitor 426.

The third mirror output 424 is coupled to a ramp capacitor 446 by way of an electrically-controlled switch 448 (hereafter "switch 448"). The switch 448 defines a control input 450. The third mirror output 424 is coupled to a first terminal of the switch 448, and the second terminal of the switch 448 is coupled to a first lead of the ramp capacitor 446. The second lead of the ramp capacitor 446 is coupled to ground or common of the primary-side controller. A shorting electrically-controlled switch 452 (hereafter "shorting switch 452") is coupled in parallel with the ramp capacitor 446. The shorting switch 452 defines a control input 454. As will be discussed in greater detail below, the switch 448 periodically closes to charge the ramp capacitor 446, and the shorting switch 452 periodically closes to discharge the ramp capacitor 446.

The comparator 404 defines a non-inverting input 456, an inverting input 458, and a comparator output 460. The non-inverting input 456 is coupled to the first lead of the ramp capacitor 446, and thus the comparator 404 receives a ramp signal in the form of a voltage as a function of time accumulated on the ramp capacitor 446. The comparator output 460 is coupled to the reset output 336. As for the inverting input 458, the inverting input 458 is selectively coupled to either the sense capacitor 426 or the sense capacitor 436. In particular, the example variable frequency controller 304 (and thus the synchronization controller 202) further comprises electrically-controlled switch 462 (hereafter "switch 462") and electrically-controlled switch 464 (hereafter "switch 464"). The switch 462 has a first terminal that is coupled to the first lead of the sense capacitor 436, and a second terminal is coupled to the inverting input 458 of the comparator 404. The switch 462 also defines a control input 466. The switch 464 has a first terminal that is coupled to the first lead of the sense capacitor 426, and a second terminal that is coupled to the inverting input 458 of the comparator 404. The switch 464 also defines a control input 468. Thus, by operation of the switches 462 and 464, the variable frequency controller 304 selectively couples either a voltage held on the sense capacitor 426 to the inverting input 458, or couples the voltage held on the sense capacitor 436 to the inverting input 458.

Still referring to FIG. 4, the switch control logic 406 defines a synchronization input 470, as well as eight switch control outputs 472-488. The synchronization input 470 is coupled to the buffer output 410. The switch control output 472 is coupled to the control input 430 of switch 428. The switch control output 474 is coupled to the control input 434 of switch 432. The switch control output 476 is coupled to the control input 440 of switch 438. The switch control output 478 is coupled to the control input 444 of switch 442. The switch control output 480 is coupled to the control input 450 of switch 448. The switch control output 482 is coupled to the control input 454 of switch 452. The switch control output 484 is coupled to the control input 466 of switch 462. The switch control output 486 is coupled to the control input 468 of switch 464. The switch control output 488 is coupled to the control output 334. Thus, the switch control logic 406 selectively controls all the switches in the variable frequency controller 304, and by way of switch control output 488 also selectively controls operation of the set multiplexer 300 (FIG. 3) and reset multiplexer 302 (also FIG. 3).

In operation, the synchronization controller 202, and particularly the variable frequency controller 304, is configured to sense a synchronization signal applied to the synchronization terminal 140 (FIG. 1) by way of the sense input 330 and Schmitt-trigger buffer 400. More particularly, the switch control logic 406 senses the presence of the synchronization signal, which may have frequency that is both variable and different than the initial frequency. In the example system, when the synchronization signal is detected, the switch control logic 406 asserts the switch control output 488 to transfer frequency control to the variable frequency controller 304. Once control is transferred to the variable frequency controller 304, the example system asserts the set input to the drive logic 204 at the frequency of the synchronization signal. In particular in the example system, upon each assertion of the synchronization signal applied to the Schmitt-trigger buffer 400, the set output 332 is asserted by the Schmitt-trigger buffer 400. Asserting the set output 332 asserts the set output 210 (FIG. 2) of the synchronization controller 202, and therefore asserts set input 214 (FIG. 2) of the drive logic 204.

As discussed above, in non-fault operation the drive logic 204 (FIG. 2) is reset by the current control logic 206 (FIG. 2) when the primary current reaches the predetermined threshold. When operating at an initial frequency that is fixed, determining and limiting duty cycle to is a straightforward endeavor. However, when tracking a synchronization signal that may have a variable frequency (e.g., from 50 kilo-Hertz to 1 mega-Hertz) it is unreliable to calculate a duty cycle limit based on the expected period of the current cycle of the synchronization signal. Stated differently, until a full period of a cycle is completed, it is unreliable to determine or calculate a duty cycle, since duty cycle is defined by the ratio of an asserted time to the period of the completed cycle.

The example embodiments address the duty cycle issue by limiting duty cycle in each cycle of the synchronization signal based on a parameter of the synchronization signal in a previous cycle. In one example case, duty cycle is limited in each cycle of the synchronization signal based on a parameter of the synchronization signal in an immediately previous cycle of the of the synchronization signal. In one case, duty cycle is limited in each cycle of the synchronization signal based on the period of the synchronization signal in an immediately previous cycle.

Consider an arbitrary cycle of the synchronization signal (e.g., an asserted time and immediately following de-asserted time), the arbitrary cycle referred to as a first cycle. In accordance with example embodiments, during the first cycle the sense capacitor 426 is charged by the first mirror output 420 of the current mirror circuit 402. That is, in the first cycle the switch control logic 406 asserts the control input 430 of the switch 428 making the switch 428 conductive, and in the first cycle the switch control logic 406 de-asserts the control input 434 of the switch 432 making the switch 432 non-conductive. While the switch 428 is conductive, electrical current flowing out of the first mirror output 420 charges the sense capacitor 426. In example cases, the charging of the sense capacitor 426 ends at the end of the first cycle (e.g., at the instant in time when the synchronization signal again is asserted, starting an immediately subsequent second cycle). At the end of the first cycle the switch control logic 406 de-asserts the control input 430 to switch 428, thus making switch 428 non-conductive, and control input 434 of switch 432 remains de-asserted.

Now consider a second cycle that is subsequent (e.g., immediately subsequent) to the first cycle. In example embodiments, the variable frequency controller 304 (and thus the synchronization controller 202) asserts the reset output 336 during the second cycle to implement a duty cycle limitation. In example cases the duty cycle limit for the second cycle is based on the period of the synchronization signal in a previous cycle, here the immediately previous cycle. In particular, in the example second cycle a duty cycle limit is set based a ramp signal and the voltage held on the sense capacitor 426, where the voltage held on the sense capacitor 426 is indicative of the period of the first cycle. The voltage of the ramp signal is compared to the voltage on the sense capacitor 426, and when the voltage of the ramp signal transitions through the voltage on the sense capacitor 426, the reset output 336 is asserted. To implement the duty cycle limit in the second cycle, the switch control logic 406 couples the voltage on the sense capacitor 426 to the inventing input 458 of the comparator 404 by asserting the control input 468 making the switch 464 conductive. Moreover, during the second cycle the switch control logic 406 couples the ramp capacitor 446 to the third mirror output 424 by asserting the control input 450 of the switch 448 thereby making the switch 448 conductive. And in the second cycle the switch control logic 406 de-asserts the control input 454 of the switch 452 making the switch 452 non-conductive. While the switch 448 is conductive, electrical current flowing out of the third mirror output 424 charges the ramp capacitor 446, and the rising voltage on the ramp signal is the ramp signal. When the voltage of the ramp signal applied to the non-inverting input 456 transitions through the voltage on the sense capacitor 426 applied to the inverting input 458, the comparator output 460 asserts the reset output 336, thus implementing a duty cycle control. It is noted that, in non-fault operation, the drive logic 204 (FIG. 2) will have already been reset by the current control logic 206 by the time the reset output 336 is asserted. However, in fault operations in which the current control logic 206 is calling for too much current (e.g., the output voltage $V_{OUT}$ is shorted), the reset output 336 resets the drive logic 204 to prevent an overcurrent condition.

Now consider a third cycle that is subsequent (e.g., immediately subsequent) to the second cycle. In example systems, the sense capacitor 426 is again used create value indicative of the period of the third cycle. Thus, the example switch control logic 406: de-couples the sense capacitor 426 from the comparator 404 by de-asserting the control input 468 of the switch 464; then discharges the sense capacitor 426 by momentarily asserting the control input 434 of the switch 432; and then arranges the system as in the first cycle to again charge the sense capacitor 426.

Consider again the first cycle. In order to provide the duty cycle limit during the first cycle (and while the sense capacitor 426 is being charged), again the variable frequency controller 304 (and thus the synchronization controller 202) asserts the reset output 336 to implement a duty cycle limitation. In example cases the duty cycle limit for the first cycle is based on the period of the synchronization signal in a previous cycle, here the immediately previous cycle (referred to as the zeroth cycle). In particular, in the example first cycle the duty cycle limit is set based the ramp signal and the voltage held on the sense capacitor 436. The sense capacitor 436 was charged during the zeroth cycle, and the voltage held on the sense capacitor 436 is indicative of a duration of the zeroth cycle. The ramp signal is created during the first cycle and in this case compared to the voltage on the sense capacitor 436. Thus, during the example first cycle, when the ramp signal transitions through the voltage on the sense capacitor 436, the reset output 336 is asserted.

To implement the duty cycle limit in the first cycle, the switch control logic 406 couples the voltage on the sense capacitor 436 to the inventing input 458 of comparator 404 by asserting the control input 466 making the switch 462 conductive. Moreover, during the first cycle the switch control logic 406 asserts the control input 450 of the switch 448 making the switch 448 conductive, and in the first cycle the switch control logic 406 de-asserts the control input 454 of the switch 452 making the switch 452 non-conductive. While the switch 448 is conductive, electrical current flowing out of the third mirror output 424 charges the ramp capacitor 446, thus again creating the ramp signal. When the voltage of the ramp signal applied to the non-inverting input 456 transitions through the voltage on the sense capacitor 436 applied to the inverting input 458, the comparator output 460 asserts the reset output 336, thus implementing a duty cycle control in the example first cycle. Again, in non-fault operation the drive logic 204 will have already been reset by the current control logic 206. However, in fault operations in which the current control logic 206 is calling for too much current, the reset output 336 resets the drive logic 204 to prevent an over current condition.

Described a bit more abstractly, during any particular period or cycle of the synchronization signal, one capacitor is being charged with a voltage that will be indicative of the period of the cycle, the second capacitor holds a voltage indicative of the period of a previous cycle, and the voltage indicative of the period of the previous cycle is compared to the ramp signal (created anew in each cycle) to drive the reset output 336 to implement the duty cycle limitation. During a subsequent cycle (e.g., immediately subsequent), the roles of the sense capacitors are reversed, and again one capacitor is charged with a voltage that will be indicative of the period of the current cycle, the second capacitor holds a voltage indicative of the period of a previous cycle, and the voltage indicative of the period of the previous cycle is compared to the ramp signal (created anew in each cycle) to drive the reset output 336 to implement the duty cycle limitation.

Before any particular capacitor is charged, the switch control logic 406 discharges the capacitor by temporarily or momentarily asserting the control input of the capacitor's shorting switch (e.g., shorting switch 432 for the sense capacitor 426, shorting switch 442 for the sense capacitor 436, and shorting switch 452 for the ramp capacitor 446). It follows that ramp capacitor 446 is discharged every cycle of the synchronization signal, while each sense capacitor 426/436 is discharged every other cycle alternately.

The example variable frequency controller 304 has three capacitors operable as discussed above. However, the implementation should not be read to be limited to just three capacitors. For example, if the discharge rate of any capacitor limits operational speed, the capacitors may be duplicated such that, during any particular cycle, one set of capacitors is discharging while another set of capacitors is charging and/or being used as a reference.

The switch control logic 406 may take any suitable form. For example, the switch control logic may be a combination logic circuit, a combination logic circuit implementing a state machine, a processor core and embedded software, or any suitable combination of devices and circuits to implement control of the various control outputs.

Figure 5:
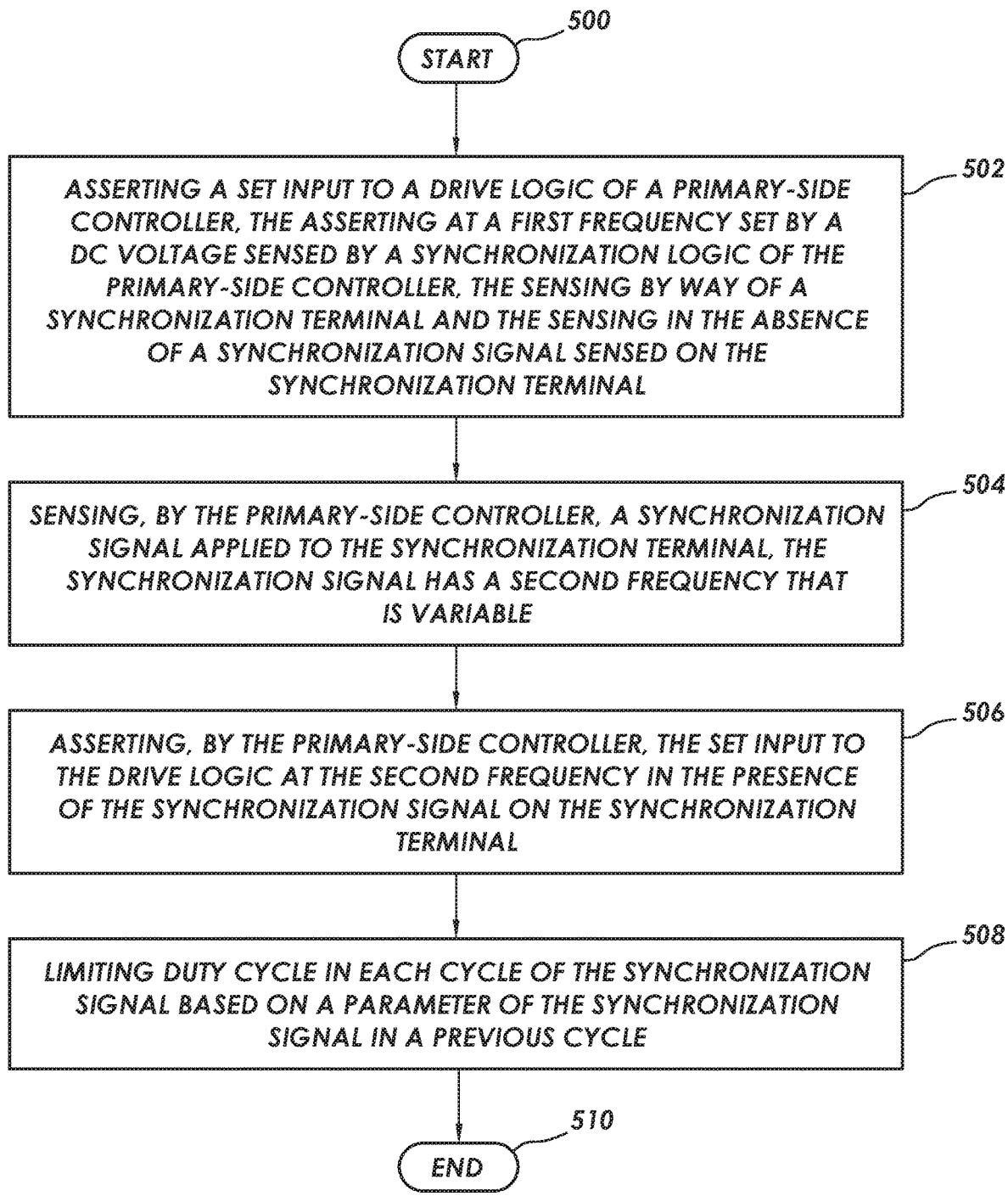
FIG. 5 shows a method in accordance with at least some embodiments.

FIG. 5 shows a method in accordance with at least some embodiments. In particular, the method starts (block 500) and comprises: asserting a set input to a drive logic of a primary-side controller, the asserting at a first frequency set by a DC voltage sensed by a synchronization controller of the primary-side controller, the sensing by way of a synchronization terminal and the sensing in the absence of a synchronization signal sensed on the synchronization terminal (block 502); sensing, by the primary-side controller, a synchronization signal applied to the synchronization terminal, the synchronization signal has a second frequency that is variable (block 504); and then asserting, by the primary-side controller, the set input to the drive logic at the second frequency in the presence of the synchronization signal on the synchronization terminal (block 506); and limiting duty cycle in each cycle of the synchronization signal based on a parameter of the synchronization signal in a previous cycle (block 508). Thereafter the method ends (block 510), likely to be immediately re-started.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. For example, the synchronization signal may take any suitable form, such as an AC signal, a pulse train, and/or a pulse train with non-zero average voltage. It is intended that the following claims be interpreted to embrace all such variations and modifications.

What is claimed is:

1. A method of operating a switching power converter, comprising:
    operating, by a primary-side controller, the switching power converter at a first frequency set by a resistor coupled to a first terminal of the primary-side controller; and
    sensing a synchronization signal applied to the first terminal of the primary-side controller, the synchronization signal has a second frequency that is variable; and then
    operating, by the primary-side controller, the switching power converter at the second frequency,
wherein operating the switching power converter at the second frequency further comprises:
    charging, during a first cycle of the synchronization signal, a first capacitor within the primary-side controller; and
    setting, in a second cycle of the synchronization signal, a duty cycle limit of a drive signal driven to a drive terminal of the primary-side controller, the setting based on a second ramp signal transitioning past a voltage held on the first capacitor.

2. The method of claim 1 wherein operating the switching power converter at the second frequency further comprises limiting a duty cycle of a main switching signal in each cycle of the synchronization signal based on a parameter of the synchronization signal in a previous cycle of the synchronization signal.

3. The method of claim 2 wherein limiting the duty cycle in each cycle of the synchronization signal further comprises limiting the duty cycle of the main switching signal in each cycle of the synchronization signal based on an immediately previous cycle of the synchronization signal.

4. The method claim 2 wherein limiting the duty cycle in each cycle of the synchronization signal further comprises limiting the duty cycle in each cycle of the main switching signal based on a period of the synchronization signal in an immediately previous cycle.

5. The method of claim 1 further comprising generating the second ramp signal in the second cycle by charging a third capacitor.

6. The method of claim 1 further comprising, during the first cycle of the synchronization signal, setting the duty cycle limit of the drive signal in the first cycle based on a first ramp signal transitioning past a voltage held on a second capacitor, the second capacitor distinct from the first capacitor.

7. The method of claim 6 further comprising:
    charging, during a third cycle of the synchronization signal immediately prior to the first cycle, the second capacitor within the primary-side controller; and
    setting, in the first cycle of the synchronization signal, the duty cycle limit of the drive signal in the first cycle based on the first ramp signal transitioning past a voltage held on the second capacitor.

8. The method of claim 7 further comprising generating the first ramp signal in the first cycle by charging a third capacitor.

9. A primary-side controller for a switching power converter, the primary-side controller comprising:
    a synchronization terminal and a drive terminal;
    a synchronization controller defining a synchronization input, a set output, and a reset output, the synchronization input coupled to the synchronization terminal;
    a drive logic defining a set input, a reset input, and a drive output, the set input coupled to the set output, the reset input coupled to the reset output, and the drive output coupled to the drive terminal, the drive logic configured to drive a control input of an electrically controlled switch;
    the drive logic is configured to assert the drive output responsive to assertion of the set input, and the drive logic configured to de-assert the drive output responsive to assertion of the reset input;
    the synchronization controller is configured to:
        assert the set input to the drive logic at a first frequency set by a direct current voltage (DC voltage) sensed by the synchronization controller on the synchronization terminal in an absence of a synchronization signal sensed on the synchronization terminal;
        sense a synchronization signal applied to the synchronization terminal, the synchronization signal has a second frequency that is variable;
        assert the set input to the drive logic at the second frequency in a presence of the synchronization signal on the synchronization terminal; and
        limit duty cycle in each cycle of the synchronization signal based on a parameter of the synchronization signal in a previous cycle.

10. The primary-side controller of claim 9 wherein the synchronization controller further comprises:
    a current mirror defining a first mirror output and a third mirror output;
    a first sense capacitor coupled to the first mirror output;
    a second sense capacitor holding a voltage proportional to a period of a previous cycle of the synchronization signal;
    a ramp capacitor coupled to the third mirror output;
    during a first cycle of the of the synchronization signal, the synchronization controller is configured to:
        charge the first sense capacitor by way of the first mirror output;
        charge the ramp capacitor by way of the third mirror output, the charging creates a first ramp signal;
        assert the reset output of when a magnitude of the first ramp signal crosses a magnitude of the voltage of the second sense capacitor.

11. The primary-side controller of claim 10 wherein the synchronization controller further comprises:
    the current mirror defining a second mirror output;

the first sense capacitor holding a voltage proportional to a period of the first cycle of the synchronization signal;
the second sense capacitor coupled to the second mirror output;
the ramp capacitor coupled to the third mirror output;
during a second cycle of the of the synchronization signal, the synchronization controller is configured to:
charge the second sense capacitor by way of the second mirror output;
charge the ramp capacitor by way of the third mirror output, the charging creates a second ramp signal;
assert the reset output of when a magnitude of the second ramp signal crosses a magnitude of the voltage of the first sense capacitor.

12. The primary-side controller of claim 11 wherein the first cycle of the synchronization signal is an immediately previous to the second cycle of the synchronization signal.

13. The primary-side controller of claim 9 wherein the synchronization controller further comprises:
a current mirror defining a first mirror output, a second mirror output, and a third mirror output;
a first sense capacitor coupled to the first mirror output by way of a first electrically-controlled switch defining a control input;
a second sense capacitor coupled to the second mirror output by way of a second electrically-controlled switch defining a control input;
a ramp capacitor coupled to the third mirror output by way of a third electrically-controlled switch defining a control input;
a comparator defining a first compare input, a second compare input, and a compare output, the first compare input coupled to the ramp capacitor;
a fourth electrically-controlled switch defining a control input, the fourth electrically-controlled switch coupled between the first sense capacitor and the second compare input
a fifth electrically-controlled switch defining a control input, the fifth electrically-controlled switch coupled between the second sense capacitor and the second compare input;
a control logic defining a first control output coupled the control input of the first electrically-controlled switch, a second control output coupled the control input of the second electrically-controlled switch, a third control output coupled the control input of the third electrically-controlled switch, a fourth control output coupled the control input of the fourth electrically-controlled switch, a fifth control output coupled the control input of the fifth electrically-controlled switch, and the control logic coupled to the synchronization input;
the control logic is configured to, in a first cycle of the synchronization signal:
couple the first sense capacitor to the first mirror output by way of the first electrically-controlled switch;
couple the second sense capacitor to the second compare input by way of the fifth electrically-controlled switch;
the control logic is configured to, in a second cycle of the synchronization signal:
couple the second sense capacitor to the second mirror output by way of the second electrically-controlled switch; and
couple the second sense capacitor to the second mirror output by way of the second electrically-controlled switch.

14. The primary-side controller of claim 9 wherein the drive logic is configured to drive a gate the electrically controlled switch in a form of a field effect transistor.

15. The primary-side controller of claim 9 wherein the synchronization signal is at least one selected from a group comprising: an AC signal; a pulse train; a pulse train with non-zero average voltage.

16. A switching power converter comprising:
a primary side comprising:
a primary winding of a transformer;
a main electrically-controlled switch defining a control input, the main electrically-controlled switch configured to selective couple a supply voltage to the primary winding of the transformer;
a secondary side comprising a secondary winding of the transformer, and a rectifier coupled to the secondary winding;
a primary-side controller comprising a synchronization terminal and a drive terminal, the drive terminal coupled to the control input of the main electrically-controlled switch;
the primary-side controller is configured to:
assert the drive terminal at a first frequency set by a direct current voltage (DC voltage) sensed on the synchronization terminal in an absence of a synchronization signal sensed on the synchronization terminal;
sense a synchronization signal applied to the synchronization terminal, the synchronization signal has a second frequency that is variable;
drive the control input of the main electrically-controlled switch at the second frequency in a presence of the synchronization signal on the synchronization terminal; and
limit duty cycle in each cycle of the synchronization signal based on a parameter of the synchronization signal in a previous cycle.

17. The switching power converter of claim 16 wherein the primary-side controller further comprises:
a current mirror defining a first mirror output and a third mirror output;
a first sense capacitor coupled to the first mirror output;
a second sense capacitor holding a voltage proportional to a period of a previous cycle of the synchronization signal;
a ramp capacitor coupled to the third mirror output;
during a first cycle of the of the synchronization signal, the primary-side controller is configured to:
charge the first sense capacitor by way of the first mirror output;
charge the ramp capacitor by way of the third mirror output, the charging creates a first ramp signal;
de-assert the control input of the main electrically-controlled switch when a magnitude of the first ramp signal crosses a magnitude of the voltage of the second sense capacitor.

18. The switching power converter of claim 17 wherein the primary-side controller further comprises:
the current mirror defining a second mirror output;
the first sense capacitor holding a voltage proportional to a period of the first cycle of the synchronization signal;
the second sense capacitor coupled to the second mirror output;
the ramp capacitor coupled to the third mirror output;
during a second cycle of the of the synchronization signal, the primary-side controller is configured to:

charge the second sense capacitor by way of the second mirror output;

charge the ramp capacitor by way of the third mirror output, the charging creates a second ramp signal;

de-assert the control input of the main electrically-controlled switch of when a magnitude of the second ramp signal crosses a magnitude of the voltage of the first sense capacitor.

19. The switching power converter of claim 18 wherein the first cycle of the synchronization signal is immediately previous to the second cycle of the synchronization signal.

* * * * *